United States Patent [19]

Ransheim et al.

[11] Patent Number: 4,517,845
[45] Date of Patent: May 21, 1985

[54] METHOD AND APPARATUS FOR DETERMINING THE FLOW VELOCITY OF A MOLTEN, RADIATION-EMITTING MATERIAL

[75] Inventors: Anders P. Ransheim, Helsingborg; Arne Thomsen, Astorp; Per Holmgren, Angelholm, all of Sweden

[73] Assignee: Gullfiber AB, Billesholm, Sweden

[21] Appl. No.: 501,630

[22] Filed: Jun. 2, 1983

Related U.S. Application Data

[63] Continuation-in-part of Ser. No. 414,337, filed as PCT SE 81/00372, Dec. 14, 1981, published as WO 82/02094 Jun. 24, 1982, § 102(e) date Aug. 16, 1982, abandoned.

[30] Foreign Application Priority Data

Dec. 16, 1980 [SE] Sweden ............................ 8008840
Jun. 11, 1982 [SE] Sweden ............................ 8203650

[51] Int. Cl.$^3$ ............................................. G01F 1/70
[52] U.S. Cl. ................................... 73/861.05; 73/227
[58] Field of Search .............. 73/861.05, 861.06, 227; 250/356.1, 356.2; 364/510; 376/246

[56] References Cited

U.S. PATENT DOCUMENTS

| | | | |
|---|---|---|---|
| 3,199,346 | 8/1965 | Stewart | 73/861.05 |
| 3,558,898 | 1/1971 | Block et al. | 364/510 X |
| 3,818,231 | 6/1974 | Gopal et al. | 73/861.06 X |
| 4,232,224 | 11/1980 | Graham et al. | 250/356.2 |

Primary Examiner—Charles A. Ruehl
Attorney, Agent, or Firm—Browdy and Neimark

[57] ABSTRACT

A method and an apparatus for measuring the flow velocity of a flow, stream or jet of molten radiation emitting material, in particular a freely falling jet of molten glass. The intensity of the radiation emitted from a limited section of the material flow is detected by means of two radiation detectors at two separate locations mutually spaced apart by a predetermined distance along the flow path of the material flow. From the output signals of the two radiation detectors all pulse-like amplitude variations having an amplitude exceeding a predetermined magnitude are discriminated. These pulse-like amplitude variations originate from randomly occurring, local, descrete, short variations in the intensity of the radiation emitted by the material flow caused by randomly occurring inhomogeneities in the material, for instance in the form of air bubbles in a jet of molten glass. The time interval between a pulse-like amplitude variation in the output signal from the upstream detector caused by an inhomogeneity in the material flow and the occurrence of a pulse-like amplitude variation in the output signal from the downstream detector, which has been caused by the same inhomogeneity in the material flow, is measured and used as a measure of the travel time of the material flow between the detector locations for calculating the flow velocity of the material flow. Also the volumetric flow rate of the material flow can be determined by measuring also the diameter of the material flow with the aid of a linear array of photo diodes and calculating the volumetric flow rate on the basis of measured values of the flow velocity and the diameter.

16 Claims, 6 Drawing Figures

METHOD AND APPARATUS FOR DETERMINING THE FLOW VELOCITY OF A MOLTEN, RADIATION-EMITTING MATERIAL

This is a continuation-in-part application of U.S. Ser. No. 414,337, filed as PCT SE/00372, Dec. 14, 1981, published as WO 82/02094 Jun. 24, 1982, § 102(e) date Aug. 16, 1982, now abandoned.

The present invention relates to a method and a corresponding apparatus for measuring the flow velocity of a flow, stream or jet of a molten radiation-emitting material. The invention has been made primarily for measuring the flow velocity of a freely falling jet of molten glass, but it can be used also for other molten, radiation-emitting materials, as ceramic or mineral materials and metals. A development of the invention concerns also measuring the volumetric or mass flow rate of a stream, flow or jet of molten radiation-emitting material by measuring the flow velocity as well as the diameter of the stream, flow or jet and calculating the volumetric flow rate on the basis of these measured data.

Measuring the flow velocity of a molten material must of course be made without any mechanical contact with the material. Methods for measuring the velocity of movement of elongate solid objects, as for instance wire, strip, paper web and similar, without mechanical contact with the object are previously known, in which the moving object is provided with regularly spaced marks and the time of travel of these marks between two mutually spaced locations along the path of the moving object is measured. These marks may in these cases consist of colour dots or locally heated sections of the object, which are provided by periodically irradiating the object by means of short radiation pulses from an IR radiation source. However, this method can of course not be used for measuring the flow velocity of a molten material which emits radiation in itself. It is also previously known to measure the flow velocity of a liquid containing gas bubbles by directing a light beam through the liquid flow at two mutually spaced locations and detecting the passage of the gas bubbles in the liquid at these locations for determining the travel time of the gas bubbles and thus the travel time of the liquid between said two locations. Neither this method can of course be used for determining the flow velocity of a molten material which emits radiation in itself, as for instance a freely falling jet of molten glass.

As a matter of fact, no satisfactory method is known in the prior art for determining the flow velocity of a stream, flow or jet of a molten radiation-emitting material, as for instance a freely falling jet of molten glass, with a sufficient accuracy.

The present invention concerns a novel and very satisfactory and advantageous method for this purpose. The method according to the invention is based on the discovery that a stream, flow or jet of a molten radiation-emitting material, as particularly molten glass, emits a radiation being of such a nature that, if the radiation emitted from a restricted section of the material flow is detected, for instance by means of a suitable radiation detector, the output signal from this detector has for its major part a noise character but comprises also pulse-like and very large amplitude variations which appear randomly in the signal. This short and large amplitude variations in the output signal of the detector must correspond to local, descrete and randomly occurring variations of the intensity of the radiation emitted by the material, which variations are most probably caused by local, descrete, randomly occurring inhomogeneities in the material. In molten glass these inhomogeneities consist probably of air bubbles in the glass smelt, as it has been found that said pulse-like intensity variations in the radiation appear also from glass materials with very high purity. For other molten radiation-emitting materials as for instance ceramic and mineral materials, similar gas or air bubbles are probably present and will give cause to similar, pulse-like, randomly occurring intensity variations in the emitted radiation. In molten metals there are also in most cases local, descrete inhomogeneities, for instance in the form of slag particles, which can give cause to similar pulse-like, randomly occurring intensity variations in the radiation emitted by the material.

The invention is based on the novel principle that it should be possible to utilize these pulse-like, randomly occurring intensity variations in the radiation emitted by the material for determining the flow velocity of the material in that the radiation emitted from a limited section of the material flow is detected at two mutually spaced locations along the flow path and the time interval is measured between the occurrence of such a pulse-like intensity variation at the upstream location and the occurrence of the same pulse-like intensity variation at the down-stream location.

This measuring principle involves, however, a very substantial problem in that said intensity variations occur completely randomly and consequently with a varying and completely random mutual spacing in time. A correct measuring of the flow velocity of the material requires, however, that it is possible to determine the time interval between the detections of exactly the same intensity variation at the two mutually spaced locations along the path of the flow. This is not easily achieved, as the intensity variations occur completely randomly and one intensity variation can not be readily distinquished from another intensity variation.

According to the invention this problem can be solved in two different ways.

According to a first embodiment of the invention the time interval between the occurrence of an intensity variation in the radiation at the upstream detector location and the first subsequent intensity variation appearing in the radiation at the down-stream detector location is measured only under the provision that the intensity variation detected at the upstream location has been preceded by a predetermined period of time during which no intensity variation has appeared in the radiation at the upstream detector location, said predetermined period of time being sufficiently long to exceed with certainty the travel time of the material flow between the two detector locations. In this manner it is achieved that a time interval is measured which is a true measure of the travel time of the material flow between the two detector locations.

According to a second embodiment of the invention the time interval between the occurrence of an intensity variation in the radiation at the upstream detector location and the first subsequent intensity variation occurring in the radiation at the down-stream detector location is measured repeatedly and a large number of such measured time intervals are analyzed for determining the most frequent value of said measured time intervals. This most frequent value corresponds in fact, as will be explained in more detail in the following, to the travel time of the material flow between the two detector locations and can consequently be used for calculating the flow velocity of the material.

The invention will now be described in more detail with reference to the accompanying drawing, in which FIG. 1 illustrates schematically and by way of example a typicle nature of the output signal from a photo detector receiving radiation emitted from a limited section of a jet of molten glass;

Figure 5:
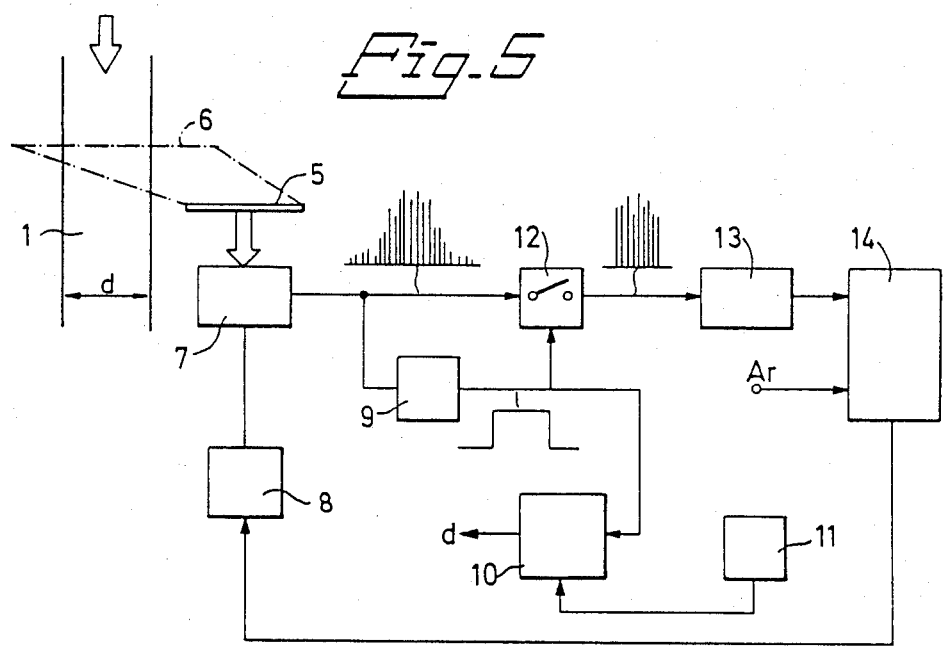
Figure 6:
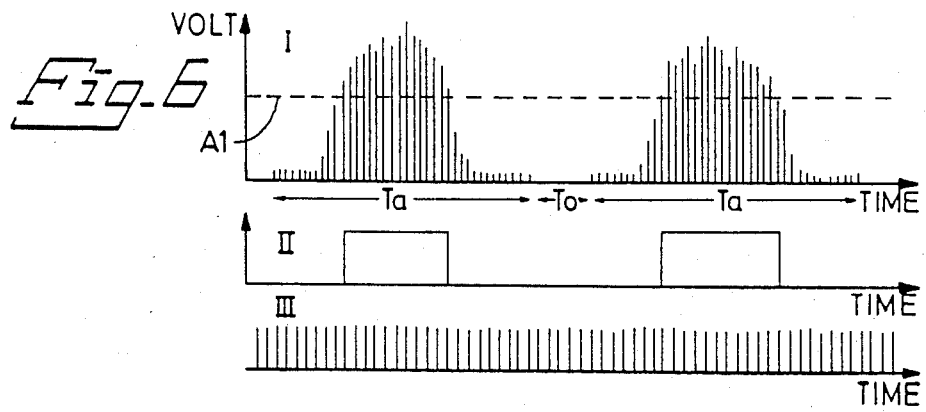

FIG. 5 is a simplified circuit diagram for an embodiment of the invention for measuring also the diameter of a stream, flow or jet of molten radiation-emitting material for determining the volumetric flow rate of the material; and FIG. 6 is a diagram schematically illustrating the wave form of certain signals in the apparatus according to FIG. 5, used for explaining the principles of operation of this apparatus.

Figure 1:
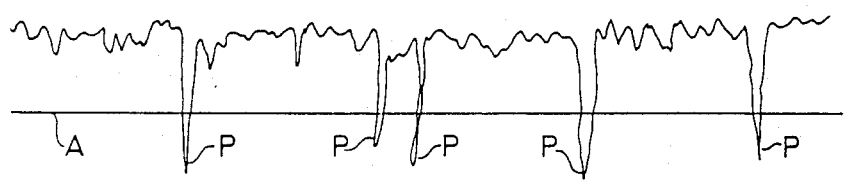
Figure 2:
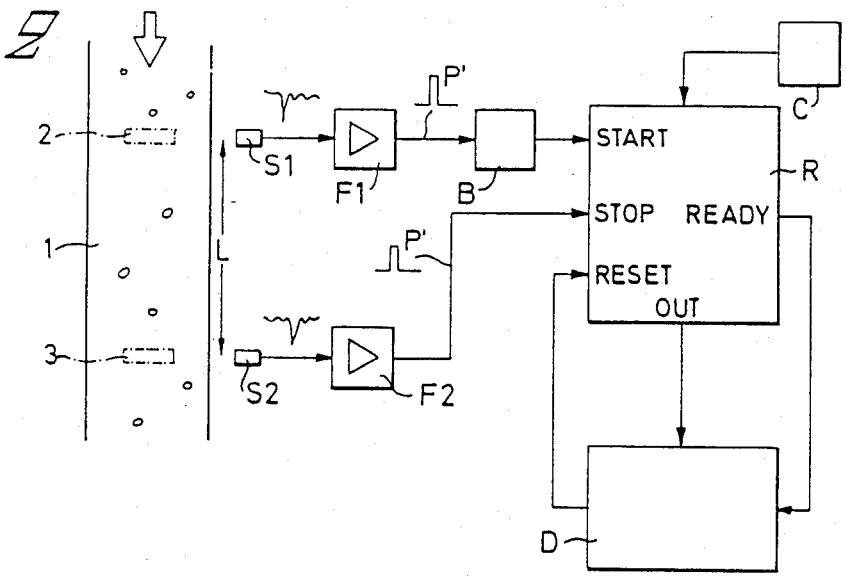
FIG. 2 is a simplified circuit diagram for a first embodiment of an apparatus according to the invention for measuring the flow velocity of a jet of molten glass.

FIG. 2 shows schematically a first embodiment of an apparatus according to the invention for measuring the flow velocity of a freely falling jet 1 of molten glass. The apparatus comprises two radiation detectors S1 and S2 which are located at a predetermined mutual distance L along the glass jet 1 and are arranged to receive, through a suitable optical system not shown in detail, radiation from two limited sections of the glass jet. In the drawing these two limited sections of the glass jet are schematically indicated as dotted rectangles 2 and 3, respectively. Thus, these rectangles can be regarded as "viewing windows" for the radiation detectors S1 and S2, respectively. Each of the detectors provides an electric output signal having in principle the form illustrated by way of example in FIG. 1. This signal has for its major part the nature of a noise signal, but it comprises also a plurality of randomly occurring, pulse-like, large amplitude variations P. These amplitude variations P are caused by randomly occurring, short intensity variations in the radiation emitted by the glass jet 1, and these intensity variations are most probably caused by randomly occurring air bubbles 4 in the glass material. When such an air bubble passes the viewing window 2 or 3, it causes a pulse-like amplitude variation P in the output signal from the associated detector S1 or S2, respectively, the magnitude of this amplitude variation being dependent on i.a. the size of the bubble and its distance from the external surface of the glass jet 1. It will be realized that the time of travel of a given air bubble from the upstream viewing window 2 to the downstream viewing window 3 will be equal to the travel time of the glass jet 1 over the distance L, wherefore it can be used for determining the flow velocity of the glass jet in accordance with the expression $$V = L/T$$

where V is the flow velocity and T is the travel time of the air bubble.

The output signals from the two detectors S1 and S2 are each applied to a respective amplifying and signal-processing circuit F1 and F2. Each circuit F1 and F2, respectively, discriminates from the output signal of the associated radiation detector any pulse-like amplitude variations P having an amplitude exceeding a predetermined amplitude level, for instance the amplitude level A in FIG. 1 and provides on its output a corresponding signal pulse P' for each such amplitude variation P.

The signal pulses P' from the amplifier F1 are applied to the start input of a time measuring circuit R through a gating circuit B, whereas the signal pulses P' from the amplifier F2 are applied directly to the stop input of the time measuring circuit R. The time measuring circuit R may comprise a digital counter driven from a clock pulse generator C. The time measuring circuit R is consequently started by an air bubble 4 in the glass jet 1 passing the viewing window 2 of the upstream detector S1 and is stopped again as soon as thereafter an air bubble 4 passes the viewing window 3 of the downstream detector S2. When the circuit 3 has in this way measured a time interval, it provides a ready signal to a calculating unit D, for instance comprising a microprocessor, which receives the measured value from the output of the time measuring circuit R and at the same time resets the time measuring circuit. The time measuring circuit R is subsequently restarted by another air bubble 4 passing the viewing window 2 of the upstream detector S1.

In order to ensure that the time interval measured by the time measuring circuit R actually corresponds to the travel time of the glass jet 1 over the distance L between the detectors S1 and S2, it is obviously necessary that the time measuring circuit R is started and stopped under the influence of exactly the same air bubble 4 in the glass jet 1. It will be realized that this will be the case only if no bubbles 4 are present in the space between the viewing windows 2 and 3, when a bubble passes the upstream window 2 and starts the time measuring circuit R. In the embodiment of the invention illustrated in FIG. 2 this condition is satisfied by means of the gating circuit B. The gating circuit B is designed in such a manner that it is opened or enabled to allow through a signal pulse P' from the amplifier F1 only after the passage of the predetermined period of time after the appearance of the preceding signal pulse P' from F1. This predetermined period of time is so selected that it corresponds at least to the maximum expected travel time of the glass jet 1 over the distance L between the two viewing windows 2 and 3. In this way it is ensured that the time intervals measured by the time measuring circuit R do actually correspond to the travel time of the glass jet 1 between the viewing windows 2 and 3, in spite of the fact that the air bubbles 1 appear completely randomly in the glass jet 1.

The time intervals measured by the time measuring circuit R and transferred to the calculating unit D are used by the calculating unit D for calculating the flow velocity of the glass jet 1 in accordance with the expression given in the aforegoing.

Preferably, the calculating unit D utilizes the mean value of a plurality of time intervals measured by the time measuring circuit R and transferred to the calculating unit D. In this way, the calculation of the flow velocity will be less sensitive to variations in the rise time of the pulses P in the output signals from the detectors S1 and S2.

Figure 3:
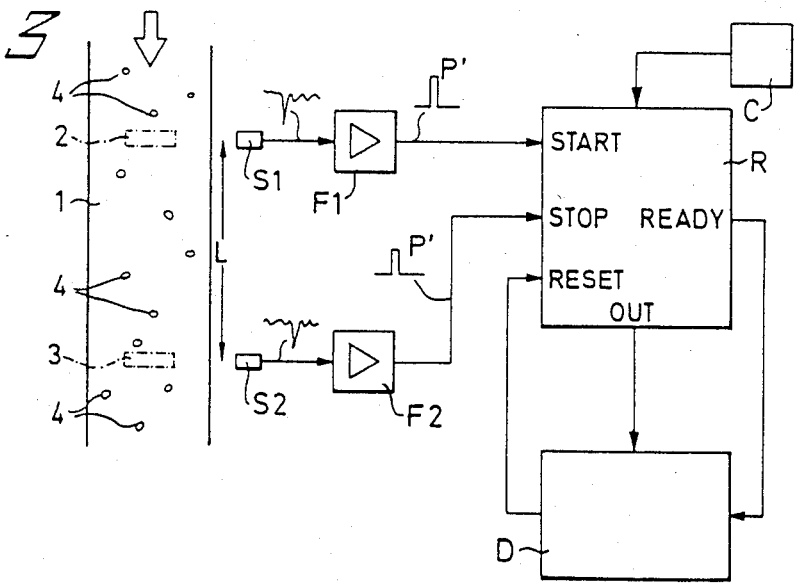
FIG. 3 is a simplified circuit diagram for a second embodiment of an apparatus according to the invention for measuring the flow velocity of a jet of molten glass.

FIG. 3 shows schematically a simplified circuit diagram for a second embodiment of an apparatus according to the invention for measuring the flow velocity of a glass jet 1. This second embodiment of the invention differs from the embodiment illustrated in FIG. 2 and described above primarily in that the gating circuit B has been omitted in the embodiment illustrated in FIG. 3. It will be realized from the foregoing that as a consequence the time measuring circuit R in the embodiment in FIG. 3 will measure a large number of time intervals which are "too short", due to the fact that bubbles 4 are present in the space between the viewing windows 2 and 3 when the time measuring circuit R is started under the influence of the passage of an air bubble at the upstream window 2, wherefore the time measuring circuit R will be stopped "too early" by one of said air bubbles already present between the viewing windows 2 and 3 and not by the same bubble which started the time measuring circuit R. It can also occur that the time interval measured by the time measuring circuit 3 will be "too long", if the bubble 4 passing the upstream window 2 and starting the time measuring circuit R does not for some reason, for instance an irregular flow pattern in the glass jet 1, pass the down-stream window 3 and thus does not influence the detector S2. In this case the time measuring circuit 3 will be stopped by a later, following bubble 4, wherefore the measured time interval will be too long.

In spite of the fact that the time measuring circuit R in the embodiment illustrated in FIG. 3 will measure a large number of "incorrect" time intervals, it is still possible by means of this embodiment of the invention to obtain an accurate information of the "correct" time interval, i.e. the travel time of a given air bubble 4 and thus of the glass jet 1 over the distance L between the viewing windows 2 and 3. According to this embodiment of the invention, this is achieved in that the calculating unit D receives and stores a large number of time intervals measured in the manner described above, for instance one hundred such time intervals. The calculating unit D is designed or programmed to sort or classify these measured time intervals with respect to their values and to determine the most frequently occurring value of these measured time intervals received by and stored in the calculating unit. Theoretically speaking, the microprocessor in the calculating unit D sets up a histogram of the kind illustrated in FIG. 4, in which the horizontal axis represents the values of the measured time intervals in classes each having a width of X μs and the vertical axis represents the number of measured time intervals N within each class. It turns out that this histogram displays a single distinct peak or maximum for the class within which the correct time interval is located, i.e. the class having the center value Y μs in FIG. 3, As the bubbles 4 appear completely randomly within the glass jet 1, the "faulty" measured time intervals will be spread out along the time axis, mainly as too short time intervals, whereas all the correct measured time intervals will be located at substantially the same value along the time axis. This analysis of the measured time intervals received from the time measuring circuit 3 is performed automatically by the microprocessor in the calculating unit D, when this has received a predetermined number of measured time intervals, for instance 100. It has been found that such a distinct peak or maximum in the histogram is obtained, if the amount of randomly distributed bubbles 4 in the glass jet 1 is such that the distance between two subsequent bubbles, which both pass both viewing windows 2 and 3 and give cause to signal pulses P' from the amplifiers F1 and F2, is larger than the distance L between the windows 2 and 3 in at least 8 to 10 % of all cases.

Figure 4:
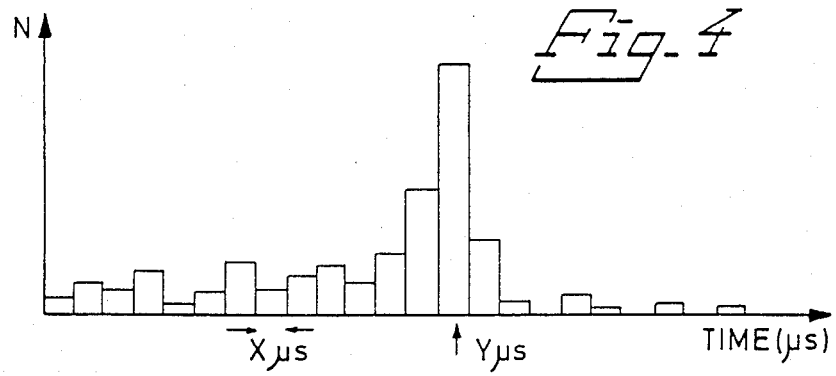
FIG. 4 is a diagram used for illustrating principles of the operation of the apparatus according to FIG. 3.

The calculating unit D could use the center value Y for the largest class of measured time intervals according to FIG. 4 as the wanted value of the travel time of the glass jet 1 over the distance L between the windows 2 and 3 and consequently calculate the flow velocity of the jet on the basis of this value in accordance with the expression given in the foregoing. However, a larger accuracy is achieved, if the caluclating unit D is designed and programmed in such a way that, after having determined the value Y in the manner described above on the basis of a first plurality of measured time intervals, for instance 100, it accepts thereafter only such measured time intervals received from the time measuring circuit R which have values within a limited range on both sides of the value Y, i.e. within the range Y±Z %. The calculating unit D collects and stores a predetermined number, for instance 100, of such accepted measured time intervals and calculates the mean value of these accepted measured time intervals. This mean value is then regarded as the correct value of the travel time of the glass jet 1 over the distance L between the viewing windows 2 and 3. Preferably, this mean value is updated repeatedly in that a new mean value is caluclated for each new accepted measured time interval received from the time measuring circuit R so that the mean value is always calculated on the basis of a predetermined number, for instance 100, of the accepted measured time intervals last received, Further, the value Y is changed successively to be equal to the mean value last calculated, whereby only such measured time intervals from the time measuring circuit R will be accepted which have values within the range ±Z % on both sides of the last calculated mean value. In this way the measurement will follow automatically the variations in the flow velocity of the glass jet 1. If the calculating unit should not receive any acceptable measured time intervals from the time measuring circuit R during a predetermined period of time, the calculating unit D will start the process from the beginning and establish a new histogram according to FIG. 4 in the manner described above in order to find a correct value of Y. This may for instance be necessary in connection with very rapid changes in the flow velocity of the glass jet.

As mentioned above, it is sufficient if the number of "accepted", i.e. correct, measured time intervals from the time measuring circuit R is at least about 8 to 10% of the total number of measured time intervals. This can be ensured by an appropriate selection of the distance L between the viewing windows 2 and 3, the size of the viewing windows and the magnitude of the amplitude level A in the amplifiers F1 and F2 in relation to the number of air bubbles 4 randomly present in the glass jet and to the velocity of the glass jet, in such a manner that the mutual spacing in time between subsequent signal pulses P' in the output signal from each of the amplifiers F1 and F2 will exceed the travel time of the glass jet between the viewing windows 2 and 3 in at least about 8 to 10% of all cases. It will be realized that if the distance L between the viewing windows 2 and 3 is made smaller, then the spacing in time between subsequent signal pulses P' will increase relative to the travel time of the glass jet 1 between the viewing windows. In similar way, a reduction of the size of the viewing windows 2 and 3 will reduce the number of bubbles 4 passing these windows and influencing the detectors S1 and S2, wherefore the mutual spacing in time between subsequent signal pulses P' will increase for an unchanged total number of bubbles in the glass jet 1 and an unchanged flow velocity of the jet. In similar way, a larger amplitude level A in the amplifiers F1 and F2 will reduce the number of signal pulses P' and consequently increase the mutual spacing in time between subsequent signal pulses P' for an unchanged total number of bubbles 4 in the glass jet and an unchanged flow velocity of the jet.

As mentioned in the foregoing, an apparatus according to the invention can be further developed to determine not only the flow velocity of the material but also its volumetric flow rate, which is of interest in many applications, as for instance in glass fiber production plants, where it is important to be able to measure the volumetric flow rate of the freely falling jet of molted glass down to the spinners. For this purpose it is necessary to determine, in addition to the flow velocity of the glass jet, also its diameter.

The diameter of the glass jet can advantageously be be measured by means of an apparatus designed as shown schematically in FIG. 5. This apparatus comprises a linear array of photo diodes 5, which is arranged to receive, through a suitable optical system not shown in detail in the drawing, radiation emitted by the glass jet 1 along a line 6 which is perpendicular to the direction of flow of the glass jet. It will be appreciated that a number of diodes in the array 5 corresponding to the diameter d of the glass jet 1 will receive radiation from the jet, whereas the remaining diodes in the array will receive substantially only background radiation. The diodes in the array 5 are scanned or sampled periodically by means of a scanning circuit 7, which provides on its output for each scanning process a series of signal pulses, the number of which is equal to the number of diodes in the array and each of which has an amplitude corresponding to the radiation quantity received by the corresponding diode since the preceding scanning instant. Consequently, the output signal of the scanning circuit 7 has the form illustrated by the graph I in FIG. 6. This graph shows the output signal of the scanning circuit 7 for two subsequent scannings, and the total scanning time for the array 5 is designated Ta, whereas the pause between two subsequent scannings is designated To. The scanning or sampling frequency is consequently 1/Ta+To and is determined by a control circuit 8, which comprises for instance a voltage controlled oscillator for determining the scanning frequency.

The output signal of the scanning circuit 7 is applied to a digitizing circuit 9 which determines which pulses of the signal have an amplitude exceeding a predetermined level, for instance the amplitude level A1 in FIG. 6, and which produces a square wave signal of corresponding duration, i.e. having the shape illustrated by the graph II in FIG. 6. This square wave signal has consequently a duration corresponding to the number of diodes in the array 5 which have received radiation exceeding a given level A1. This square wave signal is applied to a time measuring circuit 10, for instance in the form of a digital counter driven from a clock pulse generator 11, which is kept running by the square wave signal from the circuit 9 and which consequently counts a number of clock pulses corresponding to the duration of the square wave signals. The clock pulses from the clock pulse generator 11 are illustrated by the graph III in FIG. 6. The resulting count in the digital counter of the time measuring circuit 10 will consequently constitute a measure of the diameter d of the glass jet 1 and is supplied from the time measuring circuit 10 to a calculating circuit, which receives also the measured value of the flow velocity of the glass jet 1 and which calculates the volumetric flow rate of the glass jet on the basis of these measured values.

However, a certain problem exists due to the fact that there is no sharp definite border line between the diodes in the array 5 receiving radiation directly from the glass jet 1 and those diodes in the array which should theoretically receive only background radiation. This is apparent from the form of the signal illustrated by graph I in FIG. 6, which shows that the amplitude of the output signals from the individual diodes changes gradually at the "edges" of the glass jet 1. As a consequence, the number of diodes providing an output signal exceeding the threshold value A1 will vary not only with diameter of the glass jet 1 but also with the radiation intensity of the glass jet, i.e. with the temperature of the jet. An increased temperature of the glass jet will therefore give a larger measured value for the diameter, even if the diameter of the jet is in reality constant. According to the invention this measuring error is compensated for in that the output signal of the scanning circuit 7 is applied to a switch 12 which is controlled by the square wave signal from the circuit 9 in such a manner that it is closed only for the duration of this square wave signal, whereby only those output signals from the diodes of the array 5 which exceed the threshold level A1 are passed through the contact. These signals are applied to an averaging circuit 13 which determines the mean amplitude value of these signal pulses and supplies a corresponding signal to a contral circuit 14. In the contral circuit 14 said mean value signal from the the circuit 13 is compared with a reference value Ar and the control circuit 14 provides in response to this comparison a contral voltage to the voltage controlled oscillator in the control circuit 8. In response to this control voltage the circuit 8 adjusts the scanning or sampling frequency for the array 5 in such a manner that the mean amplitude of the photo diode signals exceeding the threshold value A1 is maintained constant and equal to the reference amplitude Ar. It will be appreciated that this is possible, since the amplitude of the signal pulses from the diodes of the array 5 increases when the scanning or sampling period Ta+To increases, as each diode will then have time to receive a larger radiation quantity between subsequent scannings of the diode. In this way an automatic compensation of the diameter measurement for any variations in the temperature of the glass jet 1 and thus in its radiation intensity is achieved.

In an apparatus according to the invention for measuring both the flow velocity and the diameter of a stream, flow or jet of molten, radiation emitting material the photo diode array 5 is preferably located between the two radiation detectors S1 and S2, whereby the velocity and the diameter will be measured at substantially the same location along the material flow.

We claim:
1. A method for measuring the flow velocity of a flow, stream or jet of a molten radiation-emitting material, comprising the steps of
(a) detecting the intensity of the radiation emitted from a limited section of the material flow at two separate locations, which are spaced apart by a predetermined distance along the path of the flow, and generating corrresponding electric signals,
(b) discriminating from said signals from said two detecting locations all pulse-like amplitude variations exceeding a predetermined amplitude, said amplitude variations originating from randomly occurring, local, descrete deviation in the intensity of the radiation of the material flow caused by the presence of local inhomogeneities in the material, (c) determining the time interval between the occurrence of such an amplitude variation in the signal from the upstream detecting location and the occurrence in the signal from the down-stream detecting location of the amplitude variation caused by the same inhomogeneity in the material which caused said amplitude variation in the signal from the upstream detecting location, and (d) using said time interval as a measure of the time of travel of the material flow over said predetermined distance between said two detecting locations for calculating the flow velocity of the material flow.

2. A method as claimed in claim 1, wherein the time interval in step (c) is determined by measuring the time interval between the occurrence of an amplitude variation in the signal from the upstream detecting location and the first subsequent amplitude variation occurring in the signal from the downstream detecting location only when said amplitude variation in said signal from the upstream detecting location is preceded by a predetermined period of time without any amplitude variations occurring in said signal from the upstream detecting location, said predetermined period of time being selected to exceed the maximum expected travel time for the material flow over said distance between said two detecting locations.

3. A method as claimed in claim 2, wherein said time interval is measured repeatedly and the mean value of a plurality of said measured time intervals is used as a measure of the travel time of said material flow over said predetermined distance.

4. A method as claimed in claim 1, wherein said time interval in step (c) is determined by (e) measuring repeatedly the time interval between the occurrence of such an amplitude variation in the signal from the upstream detecting location and the first subsequent amplitude variation occurring in the signal from the downstream detecting location, and (f) determining on the basis of a plurality of such measured time intervals the most frequently occurring value of said measured time intervals, said most frequently occurring value being used as a measure of the time of travel of the material flow over said predetermined distance.

5. A method as claimed in claim 4, wherein after having in step (f) determined the most frequently occurring value of a plurality of time intervals measured according to step (e), only such time intervals are selected among the time intervals repeatedly measured according to step (e) which have values within a predetermined value range on both sides of said most frequently occurring value and the mean value of a plurality of such selected time intervals is determined.

said mean value being used as a measure of the travel time of the material flow over said predetermined distance.

6. A method as claimed in claim 5, wherein after having determined said mean value once on the basis of a predetermined number of said selected time intervals, said mean value is updated in that for each new selected time interval a mean value is calculated of said predetermined number of the last selected time intervals. whereafter only such time intervals are selected which have values within said predetermined value range on both sides of the last calculated mean value.

7. A method as claimed in claim 4, wherein the size of said limited sections of the material flow and said predetermined distance between said two detecting locations and said predetermined amplitude of said amplitude variations are selected in relation to the number of said inhomogeneities present in the material and to the flow velocity of the material flow in such a manner that the mutual spacing in time between subsequent amplitude variations exceeding said predetermined amplitude in said signals from said detecting locations exceeds the travel time of the material flow between said detecting locations in at least about 8 to 10% of all cases.

8. A method for measuring the volumetric flow rate of a flow, stream or jet of a molten, radiation-emitting material, comprising the steps of measuring the flow velocity of the material flow by means of a method according to claim 1, measuring the diameter of the material flow and calculating the volumetric flow rate on the basis of said measured values for the flow velocity and the diameter.

9. A method as claimed in claim 8, wherein the diameter of the material flow is measured by using a linear photo diode array for detecting the radiation emitted by the material flow along a line perpendicular to the flow direction of the material flow, scanning said photo diode array periodically with respect to the quantity of radiation received by each individual photo diode since the preceding scanning instant, determining after each such scanning the number of photo diodes which have received a quantity of radiation exceeding a predetermined value and using this number of diodes together with the mutual spacing between the diodes as a measure of the diameter of the material flow, determining after each such scanning also the mean value of the radiation quantities received by said number of photo diodes, and controlling the periodicity of said scannings of the photo diode array in such a way that said mean value is caused to correspond to a predetermined reference value.

10. An apparatus for measuring the flow velocity of a flow, stream or jet of a molten radiation emitting material comprising (a) two radiation detectors arranged to receive radiation emitted from a limited section of the material flow at two different locations spaced apart by a predetermined distance along the flow path of the material flow and to produce an electric output signal each corresponding to the intensity of said received radiation.

(b) for each radiation detector a signal-processing circuit for discriminating from the output signal of said radiation detector only such pulse-like amplitude variations which exceed a predetermined magnitude and to produce corresponding signal pulses on its output, (c) a time measuring circuit having a start input connected to the output of the signal-processing circuit associated with the upstream detector for receiving signal pulses therefrom, a stop input connected to the output of the signal-processing circuit associated with the downstream detector for receiving signal pulses therefrom, and an output, for providing on said output successive values representing respective measured time intervals between a signal pulse received on said start input and a subsequent signal pulse received on said stop input, (d) a gating circuit inserted between the start input of said time-measuring circuit and the output of the signal-processing circuit associated with the upstream detector for allowing through only such signal pulses on the output of said amplifier which are preceded by a predetermined period of time being selected to exceed the maximum expected time of travel of said material flow over said predetermined distance, and (e) a calculating unit connected to the output of said time-measuring circuit for receiving the successive values appearing on said output, each representing a said measured time interval, and for using said values as a measure of the travel time of the material flow over said predetermined distance for calculating the flow velocity of the material flow.

11. An apparatus for measuring the flow velocity of a flow, stream or jet of a molten radiation-emitting material, comprising (a) two radiation detectors arranged to receive radiation emitted from a limited section of the material flow at two different locations mutually spaced apart by a predetermined distance along the flow path of the material flow and producing an electric output signal each corresponding to the intensity of the received radiation, (b) for each radiation detector a signal-processing circuit for discriminating from the output signal of the associated radiation detector only such pulse-like amplitude variations having an amplitude exceeding a predetermined magnitude and for generating corresponding signal pulses on its output, (c) a time measuring circuit having a start input connected to the output of the signal-processing circuit associated with the upstream detector for receiving signal pulses therefrom, a stop input connected to the output of the signal-processing circuit associated with the downstream detector for receiving signal pulses therefrom, and an output, for providing on said output successive values representing respective measured time intervals between a signal pulse received on said start input and a subsequent signal pulse received on said stop input, (d) a calculating unit connected to the output of said timemeasuring circuit for receiving the successive values appearing on said output, each representing a said measured time interval, and for determining on the basis of a plurality of such values representing measured time intervals the most frequently occurring value thereof and to use said most frequently occurring value as a measure of the travel time of the material flow between said two locations for calculating the flow velocity of the material flow.

12. An apparatus as claimed in claim 11, wherein said calculating unit is arranged to accept, after having determined the most frequently occurring value of a plurality of measured time intervals received from said time-measuring circuit, only measured time intervals having values within a predetermined value range on both side of said most frequently occurring value and to determine the mean value of a predetermined number of such accepted measured time intervals and to use said mean value in said calculation of the flow velocity.

13. An apparatus as claimed in claim 12, wherein said calculating unit is arranged repeatedly to update said mean value by calculating for each new accepted measured time interval received from said time-measuring circuit a new mean value on the basis of said predetermined number of accepted measured time intervals last received and to accept only such measured time intervals having values within said predetermined value range on both sides of the last calculated mean value.

14. An apparatus as claimed in claim 11 for determining also the volumetric flow rate of the material flow, comprising means for measuring the diameter of the material flow, said calculating unit being arranged to calculate the volumetric flow rate of the material flow on the basis of said measured values for the flow velocity and the diameter of the material flow.

15. An apparatus as claimed in claim 14, wherein said means for measuring the diameter of the material flow comprise a linear array of photo diodes arranged to receive radiation emitted by the material flow along a line perpendicular to the direction of flow, means for scanning this array of photo diodes periodically with respect to the radiation quantity received by each individual diode in the array since the preceding scanning event, means for determining after each scanning event the number of diodes having received a radiation quantity exceeding a predetermined level and for providing to said calculating unit a measurement value representing said number of diodes, the calculating unit being arranged to utilize said measurement value as a measure of the diameter of the material flow in the calculation of the volumetric flow rate of the material flow, means for determining the mean value of the radiation quantities received by said number of diodes, means for comparing said mean value with a reference value, and means responsive to said comparison for controlling the periodicity of said scanning of said photo diode array in a manner such that said mean value is caused to correspond to said reference value.

16. An apparatus as claimed in claim 15, wherein said photo diode array is arranged to receive radiation emitted by said material flow at a location between said two locations where said radiation detectors receive radiation emitted by the material flow.

* * * * *